(12) United States Patent
Ali et al.

(10) Patent No.: US 8,186,438 B2
(45) Date of Patent: May 29, 2012

(54) WELLBORE DEBRIS CLEANOUT WITH COILED TUBING USING DEGRADABLE FIBERS

(75) Inventors: Syed Ali, Sugar Land, TX (US); Peter J. Photos, Houston, TX (US); Francois M. Auzerais, Boston, MA (US); Douglas Pipchuk, Calgary (CA)

(73) Assignee: Schlumberger Technology Corporation, Sugar Land, TX (US)

( * ) Notice: Subject to any disclaimer, the term of this patent is extended or adjusted under 35 U.S.C. 154(b) by 272 days.

(21) Appl. No.: 12/509,223

(22) Filed: Jul. 24, 2009

(65) Prior Publication Data
US 2011/0017464 A1    Jan. 27, 2011

(51) Int. Cl.
*E21B 37/06*    (2006.01)
(52) U.S. Cl. .................. 166/312; 166/300; 166/304
(58) Field of Classification Search .................. None
See application file for complete search history.

(56) References Cited

U.S. PATENT DOCUMENTS

| | | |
|---|---|---|
| 6,016,872 A | 1/2000 | Davis |
| 6,085,844 A | 7/2000 | Palmer et al. |
| 6,164,380 A | 12/2000 | Davis |
| 6,419,019 B1 | 7/2002 | Palmer et al. |
| 7,237,610 B1 | 7/2007 | Saini et al. |
| 7,275,596 B2 | 10/2007 | Willberg et al. |
| 7,290,615 B2 | 11/2007 | Christanti et al. |
| 2006/0032633 A1* | 2/2006 | Nguyen ............ 166/280.2 |

OTHER PUBLICATIONS

Fiber Solves Hole Cleaning Problems—Special Report—FORTA Corporation, Drilling Products Division—American Oil & Gas Reporter—Aug. 2001. Davis, Keith.
SPE 81744—Reducing the Cost of Coiled Tubing Cleanouts by Conducting Them Without Nitrogen—Portman, L. 2003 Society of Petroleum Engineers, SPE/CoTA Coiled Tubing Conference, Houston, TX Apr. 8-9, 2003.
SPE 113841—Cleanouts with Coiled Tubing in Low-Bottom-Hole Pressure Wellbores—Li, J., Luft, H.B., Wilde, G. Alingig, G., Jumawid, F. 2008 Society of Petroleum Engineers. 2008 SPE/CoTA Coiled Tubing and Well Intervention Conference and Exhibition, The Woodlands, TX Apr. 1-2, 2008.

* cited by examiner

*Primary Examiner* — Zakiya W Bates
(74) *Attorney, Agent, or Firm* — Michael Dae; Daryl Wright; Robin Nava

(57) ABSTRACT

The current application discloses a method of removing debris from a wellbore including contacting debris in a wellbore with a treatment fluid, wherein the fluid contains degradable fibers, collecting at least a portion of the treatment fluid, and allowing the degradable fibers to degrade. The current application also discloses a method of removing debris from a wellbore including contacting debris in a wellbore with a treatment fluid, wherein the fluid contains degradable fibers, collecting the treatment fluid, and exposing the fluid to a composition to encourage the degradable fibers to degrade.

21 Claims, 1 Drawing Sheet

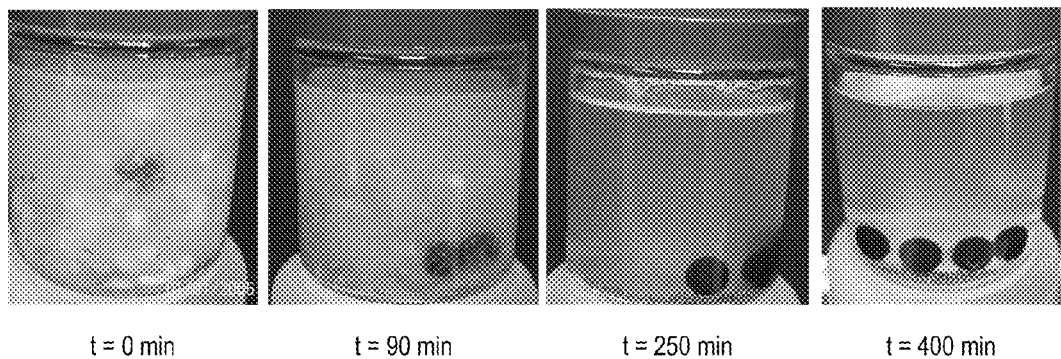
t = 0 min      t = 90 min      t = 250 min      t = 400 min

WELLBORE DEBRIS CLEANOUT WITH COILED TUBING USING DEGRADABLE FIBERS

BACKGROUND

1. Field

This invention relates to fluids for use in the oil field services industry. In particular, the invention relates to methods and compositions for fluids for use in coiled tubing applications.

2. Description of the Related Art

Cleanout is essential to optimal production because wellbore debris and solids fill are common causes of production rate decline. In addition to individual cleanout treatments, coiled tubing operations often entail a cleanout step before any main workover operations can start. The use of coiled tubing in wellbore cleanout technology is well-established. Sand cleanouts with coiled tubing have been performed for many years and 30 to 40 percent of the routine services performed in the coiled tubing industry entail wellbore debris (e.g., sand, scale, proppant, etc) cleanouts.

To make the debris and wellbore solids removal processes successful, extensive research efforts have been directed on the development of: (1) equipment such as concentric pipe, tubing operated pump-to-surface bailer and coiled tubing with jetting, (2) engineering operation supported with hydraulic modeling such as high-rate circulation, forward or reverse circulation, and (3) carrier fluids with suspension capabilities. Despite advancement in hydraulic modeling, tool design, and fluid changes, the challenge to effectively remove the wellbore solids from wellbore still remains.

A need exists for providing an effective means for the removal of undesired debris from wellbores.

SUMMARY

This invention relates to a composition and a method for removing debris from a wellbore including contacting debris in a wellbore with a treatment fluid, wherein the fluid contains degradable fibers, collecting at least a portion of the treatment fluid, and allowing the degradable fibers to degrade. Embodiments of this invention also relate to a method of removing debris from a wellbore including contacting debris in a wellbore with a treatment fluid, wherein the fluid contains degradable fibers, collecting the treatment fluid, and exposing the fluid to a composition to encourage the degradable fibers to degrade.

BRIEF DESCRIPTION OF THE DRAWING

FIG. 1 is a series of photographs of results of an embodiment of the invention.

DESCRIPTION

Embodiments of the invention relate to methods and compositions for cleaning the debris from the wellbore via coiled tubing such as sand, scale, and drill cutting from a wellbore. More particularly, the present invention relates to the use of dissolvable and/or degradable fibers for debris removal and transport from the wellbore via coiled tubing.

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. The description and examples are presented solely for the purpose of illustrating the preferred embodiments of the invention and should not be construed as a limitation to the scope and applicability of the invention. While the compositions of the present invention are described herein as comprising certain materials, it should be understood that the composition could optionally comprise two or more chemically different materials. In addition, the composition can also comprise some components other than the ones already cited.

In the summary of the invention and this description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors have disclosed and enabled the entire range and all points within the range.

Historically, there is some benefit of using fibers for wellbore debris cleanout with coiled tubing. However, the separation of fibers from wellbore debris and the disposal of separated fibers pose a serious operational problem. Using degradable fibers for wellbore debris cleanout is desirable. The returned fibers and debris are treated with appropriate chemicals to destroy the fibers and to keep the returned debris fiber-free. Thus, the returned debris can easily be disposed off. Debris can be a variety of materials and is often sand, proppant, scale, completion debris or a combination thereof.

Suitable fibers can assist in dislodging, suspending, and transporting wellbore solids such as sand, scales, proppant, and other debris to the surface. The fibers then degrade to eliminate the presence of fibers from the recovered debris.

The choice of carrier fluid will depend on the nature of operation being conducted. For example, any suitable carrier fluid, such as seawater, completion brines, and/or foam can be used as a carrier fluid. The typical completion brines may include sodium chloride, potassium chloride, calcium chloride, sodium bromide, calcium bromide, zinc bromide, potassium formate, sodium formate, cesium formate and any mixture thereof.

Further, the fluid may contain a viscosifying agent to provide sufficient viscosity to transport the fibers in the wellbore and undesired debris/fibers out of the wellbore. The preferred viscofiers include: hydroxyethylcellulose, xanthan, guar, polyacrylamide, and viscoelastic surfactants. The concentration of polymer-based viscosifiers may vary from 10 gpt to 20 gpt whereas the concentration of viscoelastic-based viscisifiers may vary from about 1 to about 6 percent depending on the type of surfactant used.

The fibers will be present in the carrier fluid in a concentration that can affect the desired purpose, i.e., maintain suspension or prevent deposition of undesired solids and/or removal of thereof. The concentration of viscosifier in the fluid may also influence the desired fiber concentration. In some embodiments, the concentration of fibers may range from 0.01 percent up to 10 percent by weight of the carrier fluid. Also, the fiber concentration may range from 0.01 percent to 5.0 percent by the weight of the fluid. In addition to providing good particle suspension and carrying ability, a dilute polymer solution and fiber mixture provides a significant drag reduction. In some embodiments, the drag reduction may be about 10 percent to about 30 percent.

The fibers employed may have a wide range of dimension, properties, and composition. Typically, fibers have a length of about 2.0 to 25 mm, in some embodiments, about 3 to about 18 mm, and in some embodiments, about 6 mm. They have a denier of about 0.1 to 20, in some embodiments, about 0.15 to 6, and, in some embodiments, about 1.4. Such values optimize the system for particle transport.

Suitable materials for the fibers include substituted and unsubstituted lactate, glycolide, polylactic acid, polyglycolic acid, a copolymer of polylactic acid and polyglycoloic acid, a copolymer of glycolic acid with other hydroxyl-, carboxylic acid-, or hydroxycarboxylic acid-containing moieties, a copolymer of lactic acid with other hydroxyl-, carboxylic acid or hydrxycarboxylic acid-containing moieties, or mixtures of these compounds.

In some embodiments, the materials for the fibers are solid cyclic dimers, or solid polymers, of certain organic acids that hydrolyze to produce organic acid. Hydrolysis is controlled by time, temperature, and/or pH. One example of a suitable material is the solid cyclic dimer of lactic acid (also known as lactide), which has melting point of 95° C. to 125° C. Other embodiments may use a polymer of lactic acid (often referred to as polylactic acid or PLA). Other embodiments may use a polymer of glycolic acid (also known as polyglycoloic acid or PGA). Other embodiments may use a copolymer of lactic acid and glycolic acid.

The fibers may be coated to slow down the hydrolysis or to tailor the fibers to exhibit other properties. Suitable coatings include polycaprolate (a copolymer of glycolide and epsilon-caprolactone) and calcium stearate. Both polycaprolate and calcium stearate are hydrophobic. Vegetable oil can also be used as a coating medium.

The fiber hydrolysis may be controlled by adjusting the pH. At both high pH and extremely low pH the degradation rate of hydrolysable particles is rapidly increased. Thus, adding an alkalizing agent, such as sodium hydroxide, potassium hydroxide, or some mixture thereof may be desirable for some embodiments. Alternatively, adding a strong acidizing agent, such as hydrochloric acid, acetic acid, formic acid, or some mixture thereof would also increase degradation rates. Typical pH values are greater than 7 or less than 1.5. In some embodiments, the pH is greater than 10, and in some additional embodiments, the pH is about 12.

EXAMPLES

The following examples are presented to illustrate the preparation and properties of fluid systems, and should not be construed to limit the scope of the invention, unless otherwise expressly indicated in the appended claims. All percentages, concentrations, ratios, parts, etc. are by weight unless otherwise noted or apparent from the context of their use.

FIG. 1 shows an example of such accelerated degradation. After the adjustment of the pH to 12, the particles hydrolyze to a minimal amount within 3 hours, and completely within 6 hours at room temperature. The pH can then be adjusted to neutral for disposal purposes without causing polymer re-precipitation.

The particular embodiments disclosed above are illustrative only, as the invention may be modified and practiced in different but equivalent manners apparent to those skilled in the art having the benefit of the teachings herein. Furthermore, no limitations are intended to the details herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A method of removing debris from a wellbore, comprising:
    contacting debris in a wellbore with a treatment fluid, wherein the fluid contains degradable fibers;
    collecting at least a portion of the treatment fluid; and
    allowing the degradable fibers to degrade,
    wherein the degradable fibers are removed from particulate matter by adjusting pH,
    wherein the fluid is returned to an upper surface of the wellbore and contains debris particulate matter removed from the wellbore.

2. The method of claim 1, wherein the degradable fibers and particulate matter are separated from the fluid.

3. The method of claim 1, wherein the adjusting the pH occurs by exposing the fibers and particulate matter to a pH adjusting agent.

4. The method of claim 3, wherein the pH adjusting agent is sodium hydroxide or hydrochloric acid or a combination thereof.

5. The method of claim 1, wherein the fibers are substituted or unsubstituted lactide, glycolide, polylactic acid, polyglycolic acid, copolymers of polylactic acid and polyglycolic acid, copolymers of glycolic acid with other hydroxy-, carboxylic acid-, or hydroxycarboxylic acid-containing moieties, copolymers of lactic acid with other hydroxy-, carboxylic acid-, or hydroxycarboxylic acid-containing moieties, polyvinyl alcohol, and/or a combination thereof.

6. The method of claim 1, wherein the fibers have a length of about 2 to about 25 mm.

7. The method of claim 1, wherein the carrier fluid is comprised of a linear polymer.

8. The method of claim 7, wherein the polymer comprises linear guar.

9. The method of claim 7, wherein the polymer comprises linear HEC.

10. The method of claim 7, wherein the polymer comprises linear xanthin.

11. The method of claim 1, wherein the carrier fluid further comprising a gelling agent that is a viscoelastic surfactant.

12. The method of claim 1, wherein the debris is sand, proppant, scale, completion debris or a combination thereof.

13. A method of removing debris from a wellbore, comprising:
    contacting debris in a wellbore with a treatment fluid, wherein the fluid contains degradable fibers;
    collecting the treatment fluid; and
    exposing the fluid to a composition to encourage the degradable fibers to degrade, wherein the degradable fibers are removed from debris by adjusting pH,
    wherein the adjusting the pH occurs by exposing the fibers and debris to a pH adjusting agent.

14. The method of claim 13, wherein the pH adjusting agent is sodium hydroxide or hydrochloric acid or a combination thereof.

15. The method of claim 13, wherein the fibers are substituted or unsubstituted lactide, glycolide, polylactic acid, polyglycolic acid, copolymers of polylactic acid and polyglycolic acid, copolymers of glycolic acid with other hydroxy-, carboxylic acid-, or hydroxycarboxylic acid-containing moieties, copolymers of lactic acid with other hydroxy-, carboxylic acid-, or hydroxycarboxylic acid-containing moieties, polyvinyl alcohol, and/or a combination thereof.

16. A method of removing debris from a wellbore, comprising:

contacting debris in a wellbore with a treatment fluid, wherein the fluid contains degradable fibers;
collecting at least a portion of the treatment fluid; and
allowing the degradable fibers to degrade;
wherein the fibers are substituted or unsubstituted lactide, glycolide, polylactic acid, polyglycolic acid, copolymers of polylactic acid and polyglycolic acid, copolymers of glycolic acid with other hydroxy-, carboxylic acid-, or hydroxycarboxylic acid-containing moieties, copolymers of lactic acid with other hydroxy-, carboxylic acid-, or hydroxycarboxylic acid-containing moieties, and/or a combination thereof.

17. The method of claim 16, wherein the fluid is returned to an upper surface of the wellbore and contains debris particulate matter removed from the wellbore.

18. The method of claim 17, wherein the degradable fibers and particulate matter are separated from the fluid.

19. The method of claim 18, wherein the degradable fibers are removed from particulate matter by adjusting the pH.

20. The method of claim 19, wherein the adjusting the pH occurs by exposing the fibers and particulate matter to a pH adjusting agent.

21. The method of claim 20, wherein the pH adjusting agent is sodium hydroxide or hydrochloric acid or a combination thereof.

* * * * *